No. 715,801. Patented Dec. 16, 1902.
O. C. HOFFMANN.
GAS OR VAPOR LAMP.
(Application filed Dec. 19, 1900.)

(No Model.) 3 Sheets—Sheet 1.

Attest:
C. H. Fowler
T. W. Fowler

Inventor:
Otto C. Hoffmann
By Howell & Butte
Attorney.

No. 715,801. Patented Dec. 16, 1902.
O. C. HOFFMANN.
GAS OR VAPOR LAMP.
(Application filed Dec. 19, 1900.)

(No Model.) 3 Sheets—Sheet 2.

Attest:
C. N. Fowler
F. N. Fowler

Inventor:
Otto C. Hoffmann
By Nowell Beutle
Attorney

No. 715,801. Patented Dec. 16, 1902.
O. C. HOFFMANN.
GAS OR VAPOR LAMP.
(Application filed Dec. 19, 1900.)
(No Model.) 3 Sheets—Sheet 3.

Attest:
C. N. Fowler
T. N. Fowler

Inventor:
Otto C. Hoffmann
By Howell & Battle
Attorney.

UNITED STATES PATENT OFFICE.

OTTO C. HOFFMANN, OF CHICAGO, ILLINOIS, ASSIGNOR TO FRANK R. GREENE, OF CHICAGO, ILLINOIS.

GAS OR VAPOR LAMP.

SPECIFICATION forming part of Letters Patent No. 715,801, dated December 16, 1902.

Application filed December 19, 1900. Serial No. 40,415. (No model.)

*To all whom it may concern:*

Be it known that I, OTTO C. HOFFMANN, a citizen of the United States, residing at Chicago, in the county of Cook and State of Illinois, have invented certain new and useful Improvements in Gas or Vapor Lamps; and I do hereby declare that the following specification, taken in connection with the drawings furnished and forming a part of the same, is a clear, true, and complete description of my invention.

My said improvements relate to lamps for burning gaseous fuel, such as ordinary illuminating-gas, and more particularly to a lamp provided with apparatus for supplying a continuous current of air to the burner or burners under pressure slightly superior to that of the surrounding atmosphere for the purpose of increasing the lighting or heating power of the lamp.

My invention consists in the employment of electrically-actuated mechanism for forcing air to the burner and in certain novel features of construction to be hereinafter described.

Figure 1:
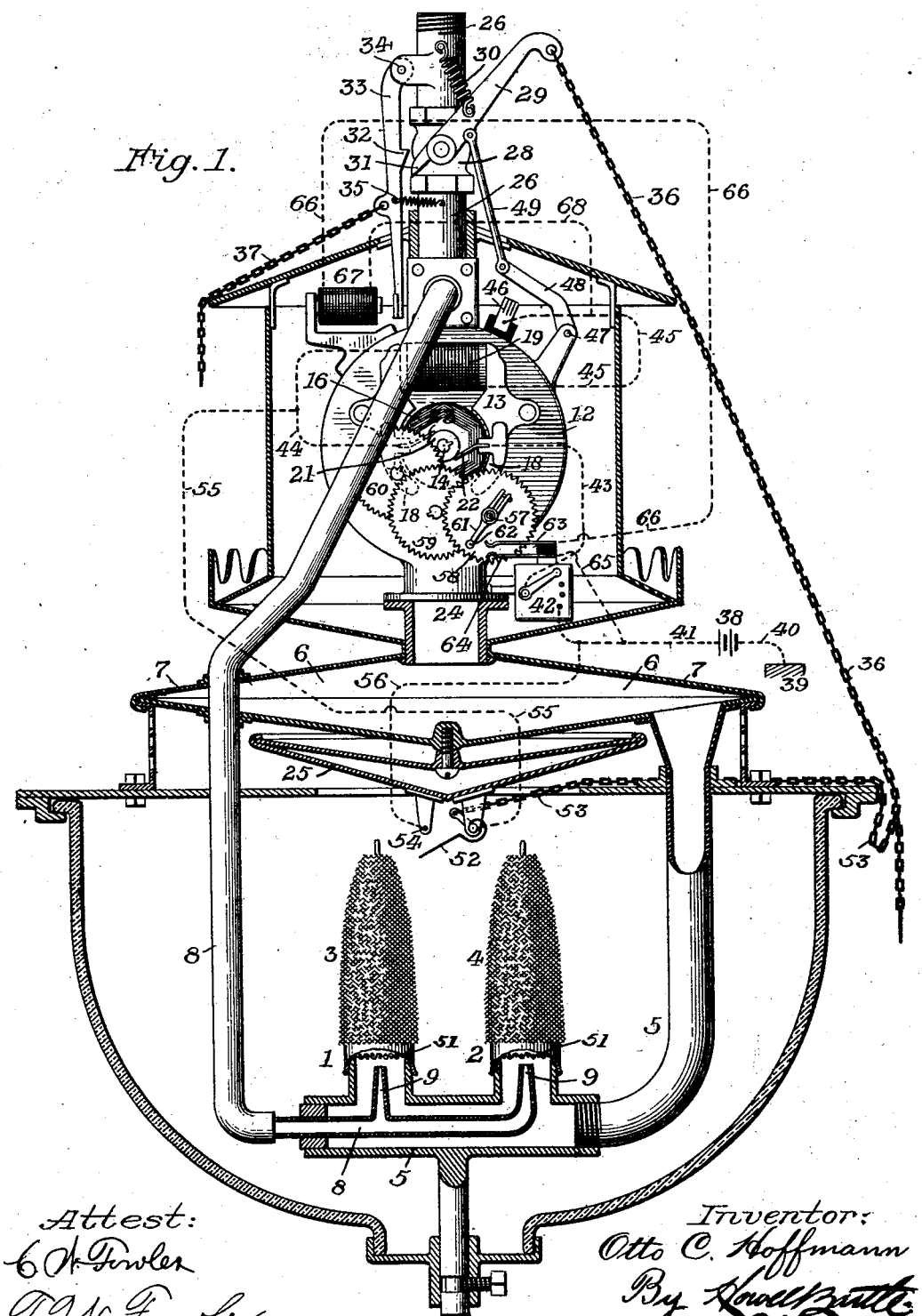
Figure 2:
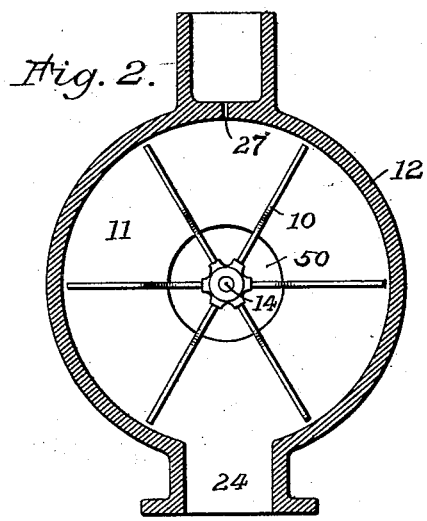
Figure 6:
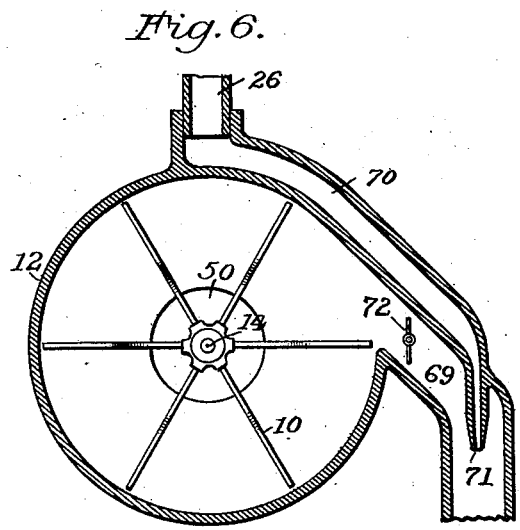
Figure 3:
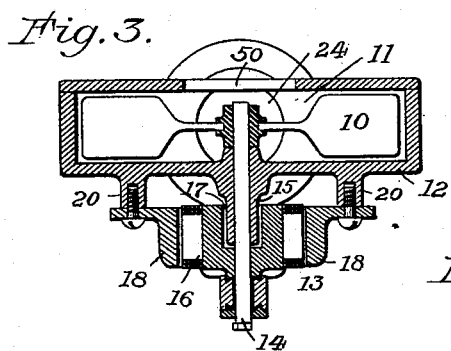
Figure 7:
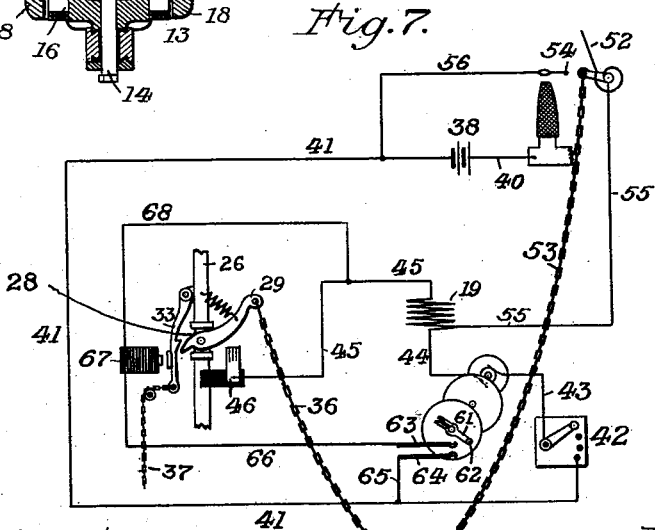
Figure 4:
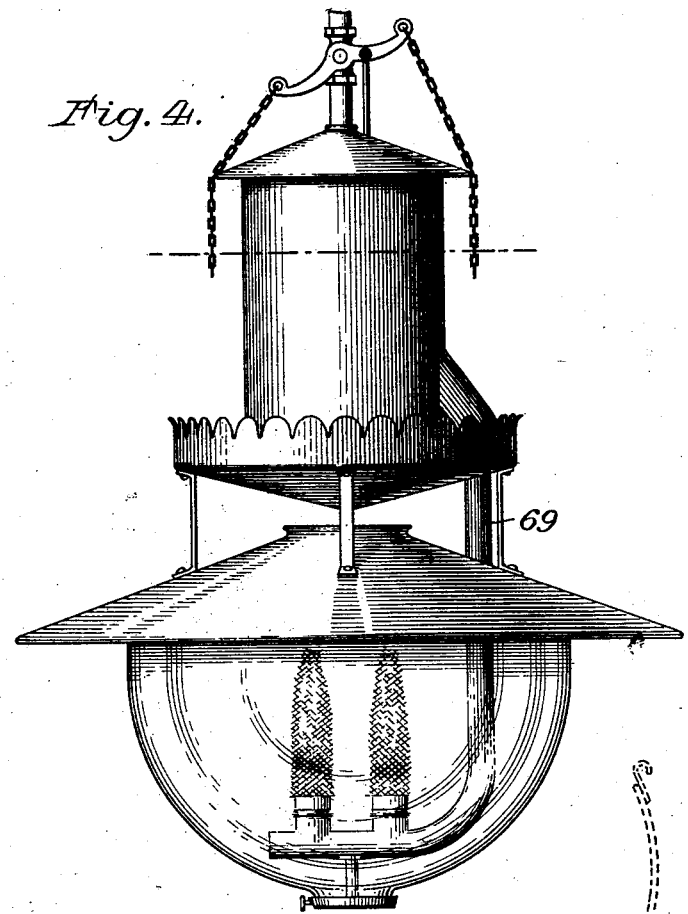
Figure 5:
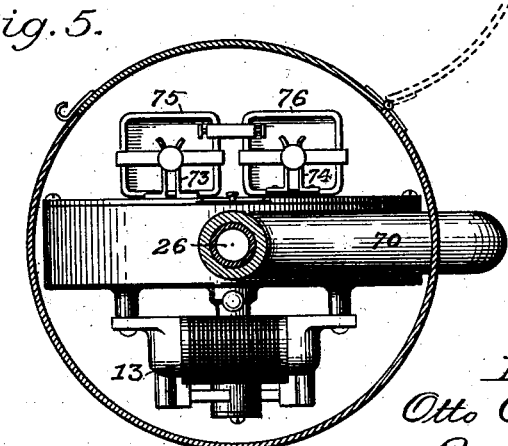

Referring to the drawings, Figure 1 illustrates a lamp embodying my invention with parts thereof shown in section and the electrical connections diagrammatically indicated in dotted lines. Figs. 2 and 3 illustrate the air-supplying device in vertical and horizontal sections, respectively. Fig. 4 is an elevation of a lamp differing in some particulars from that illustrated in Fig. 1, but embodying features of my invention. Fig. 5 is a sectional view taken on line *x x* of Fig. 4. Fig. 6 is a vertical section through the air-supplying device of the lamp of Figs. 4 and 5, and Fig. 7 is a diagram illustrating the electric circuits through the apparatus.

In the lamp illustrated in Fig. 1 two burners are shown at 1 and 2, each being provided with incandescing mantles 3 4; but it is to be understood that a single burner or a cluster of burners may be substituted for the two shown, if desired, and they may be of any form suitable to the particular use to which the lamp is to be put. Both of the burners 1 2 are connected to a pipe 5, leading from a chamber 6 of a heat-deflector 7, which is made in the form of a double cone and located above the burners for preventing heat from ascending to the motor and other parts of the apparatus. Gas is supplied to both burners from a pipe 8, which enters pipe 5 and terminates therein in nozzles 9 directly beneath each burner for supplying gas thereto in a small stream or jet, as clearly shown.

Above the heat-deflector 7 is mounted an air-supplying device consisting of a rotary fan 10, Fig. 2, inclosed within a chamber 11, the walls 12 of which afford support for a small electric motor 13, and other devices to be presently referred to. Shaft 14 of the motor is mounted on a bearing 15, cast integral with the casting forming the main walls 12 of the blower-chamber, and said shaft extends into said chamber and forms also the shaft of the fan or blower 10. The armature 16 of the motor, which is mounted on shaft 14, is made hollow for a portion of its length, as at 17, to accommodate the shaft-bearing 15, so that the motor may be placed as close as possible to the walls of the blower-chamber, the object being to make the apparatus as small and compact as possible.

The field-magnets 18, with their coil 19, are mounted on studs 20, cast integral with the wall 12 of the blower-chamber, as shown in Fig. 3. The outer end of shaft 14 carries a commutator 21, with which brushes 22 and 23 contact, as will be readily understood, the entire motor being of a common and well-known form.

The blower-chamber 11 communicates with the interior of the heat-deflector 7 by way of a pipe or passage-way 24, entering chamber 6 of said deflector at its top, so that air from the blower-chamber will pass through the heat-deflector and thence through pipe 5 to the burners. This constitutes a valuable feature of my invention. The object of the heat-deflector is to keep the upper portion of the apparatus as cool as possible, and by passing the forced draft of air through chamber 6 the upper wall of the deflector is reduced in temperature and the air on its way to the burner is heated, and the lamp as a whole is thereby converted into a regenerative lamp, with its well-known attendant advantages.

Chamber 6 is therefore a regenerating-chamber as well as a chamber for reducing the temperature of the heat-deflector.

Directly beneath the heat-deflector 7 I have placed a second hollow deflector 25, which really forms a part of the main deflector, it being suspended therefrom with an air-space between for the purpose of preventing the main deflector from becoming overheated.

On top of the blower-chamber is secured a pipe 26, which is adapted to be secured to a gas-service pipe, and to this pipe 26 is connected the pipe 8, already referred to. From pipe 26 there is a small opening 27, (see Fig. 2,) leading to the blower-chamber 11 for permitting a small quantity of gas or fuel to enter said chamber and be mixed with the air. The object of this will be explained hereinafter.

Pipe 26 is provided with a cock 28, controlled by a lever 29, and said cock is normally held in its closed position by a spring 30, secured to said pipe and lever, as clearly shown. Lever 29 is also provided with a latch 31, which when the cock is opened engages with a keeper 32 on a lever 33, pivoted at 34 and held by a light retractile spring 35. Attached to lever 29 is a chain 36, which is pulled for opening cock 28, said cock being held in its open position by the latch and keeper, as will be readily understood. Lever 33 is also provided with a chain 37, which is pulled for releasing latch 31 and permitting the cock to be closed by the spring 30, which returns lever 29 to its normal position.

Current is supplied to motor 13 from any suitable source of supply which may be located within the apparatus, as will be described hereinafter, or by outside batteries 38, as shown in Fig. 1. As there shown, battery 38 is connected to ground by a wire 40, and from the opposite side of said battery a wire 41 leads to a rheostat 42, which is provided for regulating the speed of the motor, and thereby regulating the quantity and pressure of air supplied to the burners. From rheostat 42 a wire 43 leads to brush 22 of the motor, and from the other brush 23 a wire 44 connects with the field-coil 19, and from said coil a wire 45 leads to a contact 46, which is insulated from the apparatus. Pivotally mounted, as at 47, is a contact-arm 48, having its outer end connected by a link 49 with the lever 29, so that when said lever is moved by its chain for opening cock 28 contact will be made beween arms 48 and contact 46 and the circuit from battery 38, grounded through the apparatus and the gas-supply pipe, to which it is connected, as will be readily understood. It will thus be seen that when cock 28 is opened for supplying gas to the burner or burners motor 13 will be simultaneously put into operation for supplying air under pressure, which may be regulated as desired by the rheostat 42, as will be readily understood.

Gas from a service-pipe passes through pipe 26 and pipe 8 directly to the burners, where it is discharged in a small jet directly into the burner through the nozzle 9, which materially assists in directing the air-current from the pipe 5.

The blower-chamber 11 is provided with a central opening or air-inlet 50, the size of which may be regulated in the usual manner by a damper or slide for controlling the quantity of air to be admitted. The rotary fan 10 forces the air from the inlet 50 outwardly through a pipe or outlet 24 to the regenerating-chamber 6, from which it passes through the pipe 5 to the burners. A small quantity of the gas or fuel passes from pipe 26, through an opening 27, into the blower-chamber, where it is thoroughly mixed with the air by the fan 10, the mixture containing less gas than necessary for explosion or combustion. This mixture being forced through the regenerating-chamber and heated meets the main supply of fuel before reaching the burners, and a highly-combustible mixture is produced with much less fuel than would ordinarily be required. The intimate commingling of the air and gas is greatly aided by the small amount of gas which is first mechanically mixed with the air by the rotary fan, and is further facilitated by feeding the main supply of gas more slowly with reference to the passing volume of already-mixed gas and air, and still further by the presence of a perforated diaphragm 51, located directly above each of the nozzles 9, which breaks up the ascending column of air and gas into streams, the uniting of which increases the perfect blending of the mixture.

I have provided in the apparatus of Fig. 1 an igniting device, which is of the well-known "wiping-spring" variety, and have so connected it that it received its electric energy from the same source as the motor and utilizes the field-coil of the motor as the inductive element for producing the spark, and said device is actuated by the same means employed for actuating the gas-supply cock 28. The igniter-arm 52 of said device is operated in the usual manner by means of a chain 53, which when pulled swings said arm into wiping contact with an electrode 54. Arm 52 is connected by a wire 55 with the wire 44, which connects commutator-brush 23 with the field-coil 19 of the motor, and the electrode 54 is connected to the wire 41 from the battery by a wire 56. Chain 53 is connected to the chain 36, controlling the cock 28, and is slightly longer than would be required for a direct connection, so that by pulling chain 36 cock 28 will be opened in advance of the operation of the igniter to give time for gas to reach the burners. This may also be effected by having the spring of the igniter of greater power than the spring 30, attached to the lever 29, so that the latter will be moved before sufficient power can be applied for overcoming the spring of the igniter. I also show in connection with Fig. 1 means for automatically cutting off the supply of gas and stopping the motor after the apparatus has been operating a fixed period of time, which may be regulated or varied, as desired. Mounted in any suitable manner is a shaft 57, which is geared to the motor-shaft, as by gearing 58, 59, and 60, so that said shaft 57 will be revolved, we will say, once in twelve hours. This may be readily and accurately provided for, as the speed of the motor will be practically uniform except as it may be intentionally varied. Frictionally mounted on the shaft 57 is an arm 61, carrying a contact 62, which revolves with said shaft, but which may be shifted thereon by moving arm 61. In the path of the contact 62 are two spring contacts or brushes 63 and 64, placed in such manner that contact 62 will pass between them and close a circuit from one of said brushes to the other. Brush 64 is connected by wire 65 with the wire 41, leading from battery 38, and brush 63 is connected by wire 66 with an electromagnet 67 so placed as to attract an armature secured to the lever 33 and move the latter for releasing lever 29 and permit the closing of cock 28, as already explained. Magnet 27 is also connected by a wire 68 to the wire 45, which connects the field-coil of the motor to the contact 46.

The operation of the several circuits will perhaps be best understood by referring to the diagram Fig. 7. When chain 36 is pulled for opening the gas-supply cock 28, a contact is made between the lever or arm 48 and the contact 46 and a circuit is completed for starting and operating the motor, as follows: from battery 38 (which is connected to ground by wire 40) current flows through wire 41 to the rheostat 42, thence through wire 43 to one of the commutator-brushes, and from the other commutator-brush through wire 44 to and through the field-coil 19 and wire 45 to contact 46 and through arm 48 to ground through the apparatus. The pulling of chain 36 also operates the igniter, as already explained, and the current to the igniter passes from wire 41 through wire 56 to the electrode 54, and thence through the igniter-arm 52, as the latter is pulled over the electrode, through wire 55, to and through the field-coil 19, which acts as the spark-coil, and thence by way of wire 45 to ground.

Before starting the apparatus arm 61 of the automatic stopping device is so placed on its shaft with reference to the contact-brushes 63 and 64 that a contact will not be made between said brushes until the apparatus has run the intended length of time. This may be easily regulated by swinging the arm 61 with reference to a dial, (not shown,) as will be readily understood. When the motor has made a sufficient number of revolutions to bring contact 62 between the brushes 63 and 64, current flows from wire 41 through wire 65 to brush 64, thence through the contact 62, brush 63, and wire 66 to the electromagnet 67, and thence to ground by way of wires 68 and 45. Magnet 67 being thus excited attracts its armature and moves lever 33, which releases lever 29. Spring 30 then draws lever 29 to its normal position, shutting off the fuel-supply and at the same time breaking the contact between arm 48 and contact 46 and stopping the motor. This shutting off of the fuel-supply and stoppage of the motor may be effected by hand by pulling chain 37, already referred to.

Now, referring to Figs. 4, 5, and 6, the lamp there shown differs from that already described in the fact that it is not a regenerative lamp, or, in other words, the air from the blower passes directly to the burners instead of being heated by being first passed through the heat-deflector. I also show in connection with this lamp means for supplying the electric energy for the motor and the other electrically-actuated devices, which is contained within the apparatus itself. The blower-chamber 11, fan 10, and motor 13, with its electrical connections, are as heretofore described, except that the air from the blower-chamber passes through a pipe or duct 69 directly to the burners instead of passing through the heat-deflector. The gas-supply pipe 26 connects with a duct 70, which terminates in a nozzle 71 in the pipe or duct 69, as clearly shown in Fig. 6. Pipe or duct 69 is provided with a damper 72 for controlling the air-supply, which may be used instead of a rheostat for controlling the motor, as before described. On the side of the blower-chamber opposite to that on which the motor is mounted are two spring-clasps 73 and 74, which support two storage-battery cells 75 and 76, and said clasps also serve as the electrical connections between the battery-cells and the electrical portions of the apparatus. Clasp 73 is in circuit with the metallic portions of the apparatus, while clasp 74 is insulated therefrom. Connection is made from clasp 74 to the various circuits before described, and the circuit is completed through the apparatus and clasp 73, as will be readily understood.

My entire apparatus is shown incased within a suitable cover or casing which may be made ornamental for in or out door service, but it may be arranged or incased in any manner suitable to the particular use to which it is to be put.

Having thus described my invention, what I claim as new, and desire to secure by Letters Patent, is—

1. In an apparatus of the character described, a burner, a device for supplying a continuous current of air thereto, a passage-way from said device to said burner, and a gas-supply pipe having independent connections with said passage-way and with said air-supplying device, whereby a small quantity of gas will be mixed with the air by said device and the main body of gas thereafter supplied to the mixture on its way to the burner, substantially as described.

2. In an apparatus of the character described, a burner, a chamber located in position to be heated thereby, a passage-way from said chamber to said burner, a device for forcing a continuous current of air through said chamber to said burner, a gas-supply pipe discharging into said passage-way and having an independent connection with said air-forcing device, substantially as described.

3. In an apparatus of the character described, a burner, a chamber located above said burner, a passage-way from said chamber to the burner, a fuel-supply pipe for the burner, a device located above said chamber for forcing a continuous current of air through said chamber to the burner, and a heat-deflector interposed between said chamber and the burner, substantially as described.

4. In an apparatus of the character described, a burner, a device for supplying a continuous current of air thereto, an electric motor for operating said device, an electric igniter for said burner, a valve for controlling the fuel-supply to said burner, and common means for manually actuating said valve and igniter, substantially as described.

5. In an apparatus of the character described, a burner, a device for supplying a continuous current of air thereto, an electric motor for operating said device, a switch for controlling the electric current to said motor, an igniting device, a valve for controlling the fuel to said burner, and common means for actuating said switch, igniting device, and valve, substantially as described.

6. In an apparatus of the character described, a burner, a device for supplying a continuous current of air thereto, a motor for operating said device, a valve for controlling the fuel-supply to said burner, means of opening said valve and starting said motor, and means for automatically closing said valve and stopping said motor, substantially as described.

7. In an apparatus of the character described, a burner, a device for supplying a continuous current of air thereto, an electric motor for operating said device, a valve for controlling the fuel-supply to the burner, and means for automatically closing said valve and breaking the electric circuit connected to said motor after the latter has made a predetermined number of revolutions, substantially as described.

8. In an apparatus of the character described, a burner, an electrically-actuated device for supplying a current of air thereto, a fuel-supply pipe for said burner, a valve in said pipe, an electric switch for controlling the operation of the air-supplying device, and common means for operating said valve and switch, substantially as described.

9. In an apparatus of the character described, a burner, a self-closing fuel-supply valve for said burner, means for opening said valve, a latch for holding said valve to its open position, an electric motor, a device operatively connected to said motor for supplying a current of air to said burner, and means controlled by said motor for moving said latch and releasing said valve, substantially as described.

10. In an apparatus of the character described, a burner, a device for supplying a current of air to said burner, an electric motor for operating said device, a valve for controlling the fuel-supply to said burner, means for manually opening and closing said valve, and means for automatically closing said valve after said motor has made a predetermined number of revolutions, substantially as described.

11. In an apparatus of the character described, the combination of a burner, a chamber above said burner, mechanism above said chamber for supplying a continuous current of air to said burner through said chamber, whereby the latter will be cooled by the air passing therethrough and thus protect said air-supplying mechanism from the heat of the burner and incidentally heat the air supplied to the burner, substantially as described.

OTTO C. HOFFMANN.

In presence of—
MAX BRETZ,
ERICH BRETZ.